(12) United States Patent
Zhang

(10) Patent No.: US 10,482,886 B2
(45) Date of Patent: Nov. 19, 2019

(54) INTERACTIVE ROBOT AND HUMAN-ROBOT INTERACTION METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Xue-Qin Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 100 days.

(21) Appl. No.: 15/853,918

(22) Filed: Dec. 25, 2017

(65) Prior Publication Data

US 2019/0043511 A1 Feb. 7, 2019

(30) Foreign Application Priority Data

Aug. 5, 2017 (CN) .......................... 2017 1 0663432

(51) Int. Cl.
  *G10L 17/22* (2013.01)
  *G10L 17/18* (2013.01)
  (Continued)

(52) U.S. Cl.
  CPC ............. *G10L 17/22* (2013.01); *B25J 9/0003* (2013.01); *B25J 9/161* (2013.01); *G06K 9/00288* (2013.01); *G06K 9/00302* (2013.01); *G10L 17/18* (2013.01); *G10L 25/63* (2013.01); *G10L 15/1822* (2013.01); *G10L 15/22* (2013.01); *G10L 17/00* (2013.01); *G10L 25/30* (2013.01)

(58) Field of Classification Search
  CPC ......... G10L 17/27; G10L 17/22; G10L 17/20; G10L 17/21; G10L 17/2705; G10L 17/2765; G10L 17/289
  USPC ........................ 704/272, 275, 270, 277, 278
  See application file for complete search history.

(56) References Cited

U.S. PATENT DOCUMENTS 10,037,767 B1 * 7/2018 Nichkawde ........ G06K 9/00315
2018/0082172 A1 * 3/2018 Patel .................... G06N 3/0472
(Continued)

FOREIGN PATENT DOCUMENTS

| CN | 104484656 | 4/2015 |
|---|---|---|
| TW | I447660 B | 8/2014 |
| TW | I456515 | 10/2014 |

*Primary Examiner* — Qi Han
(74) *Attorney, Agent, or Firm* — ScienBiziP, P.C.

(57) ABSTRACT

An interactive robot includes an image capturing device, an audio capturing device, an output device, and a processor. The processor is configured to obtain audio information captured by the audio capturing device and image information captured by the image capturing device, recognize a target from the audio information and the image information, confirm basic information and event information of the target and link the basic information with the event information, obtain key information from the event information of the target, implement a neural network analysis algorithm on the key information to confirm an emotion type of the target, search a preset public knowledge database according to the key information to obtain a relevant result, apply a deep learning algorithm on the relevant result and the emotion type of the target to determine a response, and execute the response through the output device.

16 Claims, 5 Drawing Sheets

(51) Int. Cl.
  *G06K 9/00* (2006.01)
  *B25J 9/00* (2006.01)
  *B25J 9/16* (2006.01)
  *G10L 25/63* (2013.01)
  *G10L 15/22* (2006.01)
  *G10L 25/30* (2013.01)
  *G10L 15/18* (2013.01)
  *G10L 17/00* (2013.01)

(56) References Cited

U.S. PATENT DOCUMENTS

2018/0136615 A1\* 5/2018 Kim .................. G05B 13/027
2018/0174020 A1\* 6/2018 Wu .................... G06N 3/006

\* cited by examiner

| Target | Name | Age | Height | Weight | Body type |
|--------|------|-----|--------|--------|-----------|
| User A | Li | 27 | 176 | 65 | Medium |
| User B | Zhang | 25 | 180 | 75 | Large |
| ∘ ∘ ∘ | ∘ ∘ ∘ | ∘ ∘ ∘ | ∘ ∘ ∘ | ∘ ∘ ∘ | ∘ ∘ ∘ |

FIG. 4

INTERACTIVE ROBOT AND HUMAN-ROBOT INTERACTION METHOD

CROSS-REFERENCE TO RELATED APPLICATIONS

This application claims priority to Chinese Patent Application No. 201710663432.4 filed on Aug. 5, 2017, the contents of which are incorporated by reference herein.

FIELD

The subject matter herein generally relates to an interactive robot and a human-robot interaction method.

BACKGROUND

Interactive robots are currently limited in the ways they can interact with people.

BRIEF DESCRIPTION OF THE DRAWINGS

Implementations of the present disclosure will now be described, by way of example only, with reference to the attached figures.

FIG. 4 is a diagram of a basic information table stored in the interactive robot.

DETAILED DESCRIPTION

Figure 1:
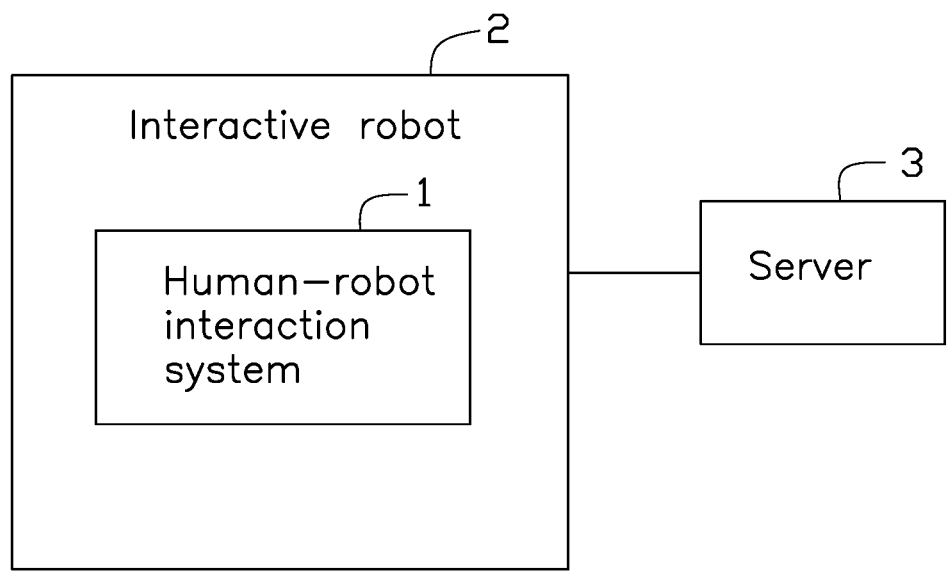
FIG. 1 is a diagram of an exemplary embodiment of an interactive robot in communication with a server.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage unit.

FIG. 1 illustrates an embodiment of an interactive robot 2 implementing a human-robot interaction system 1. The interactive robot 2 is in communication with a server 3. The human-robot interaction system 1 controls the interactive robot 2 to interact with a user.

Figure 2:
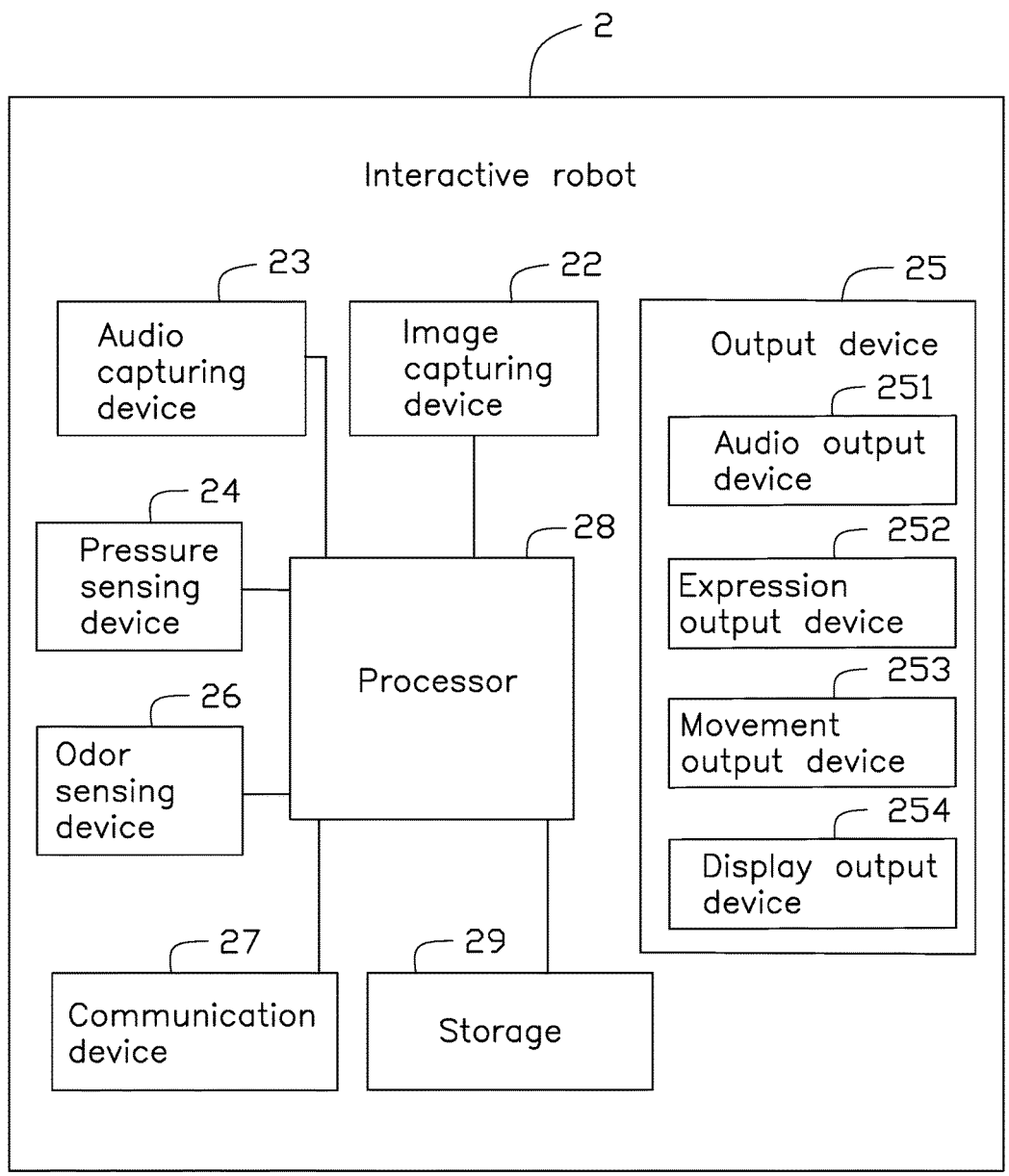
FIG. 2 is a diagram of the interactive robot of FIG. 1.

Referring to FIG. 2, the interactive robot 2 includes an image capturing device 22, an audio capturing device 23, a pressure sensing device 24, an output device 25, an odor sensing device 26, a communication device 27, a processor 28, and a storage 29. The image capturing device 22 captures image information of a surrounding environment of the interactive robot 2 and sends the captured image information to the processor 28. For example, the image capturing device 22 captures images of a user, an animal, or an object and sends the captured images of the user, animal, or object to the processor 28. In at least one embodiment, the image capturing device 22 can be a camera, a 3D camera, or the like. The audio capturing device 23 captures audio information from a surrounding environment of the interactive robot 2 and sends the captured audio information to the processor 28. In at least one embodiment, the audio capturing device 23 can be a microphone, a microphone array, or the like. The pressure sensing device 24 senses a touch signal applied onto the interactive robot 2 by a user and sends the sensed touch signal to the processor 28.

The output device 25 includes an audio output device 251, an expression output device 252, a movement output device 253, and a display output device 254. The audio output device 251 is controlled by the processor 28 to output audio information. In at least one embodiment, the audio output device 251 is a loudspeaker. The expression output device 252 is controlled by the processor 28 to output an expression. In at least one embodiment, the expression output device 252 includes a set of eyelids and a mouth on a head of the interactive robot 2 and a set of eyes that can rotate within the eyelids. The movement output device 253 is controlled by the processor 28 to control the interactive robot 2 to move. In at least one embodiment, the movement output device 253 includes wheels arranged along two axes or four axes. The display output device 254 is used to display a facial expression, such as happy, angry, sad, or the like. The odor sensing device 26 is used for detecting odors. The communication device 27 is used for establishing communication between the interactive robot 2 and the server 3 (shown in FIG. 1). In at least one embodiment, the communication device 27 can establish communication by WIFI, ZigBee, BLUETOOTH, or the like.

The storage 29 stores a plurality of instructions and data of the interactive robot 2. For example, the storage 29 stores a preset facial image, preset audio, and the human-robot interaction system 1. In at least one embodiment, the storage 29 is a storage device of the interactive robot 2, such as a hard disk or an internal storage. In another embodiment, the storage 29 is an external storage device, such as an external hard drive, a smart media card, a secure digital card, a flash card, or the like.

In at least one embodiment, the processor 28 can be a central processing unit, a microprocessor, or other data processing chip. The processor 28 executes the plurality of instructions or arithmetic data.

Figure 3:
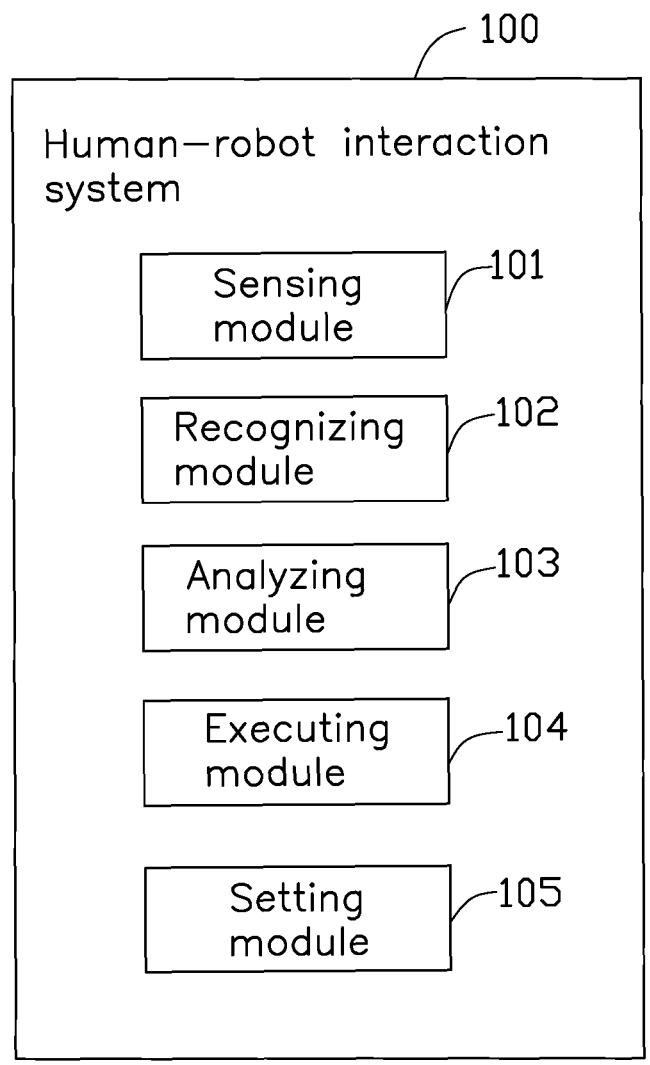
FIG. 3 is a diagram of function modules of a human-robot interactive system of the interactive robot.

FIG. 3 illustrates a plurality of modules of the human-robot interaction system 1. The human-robot interaction system 1 can be divided into a plurality of modules, which can include one or more software programs in the form of computerized codes stored in the storage 29. The computerized codes can include instructions executed by the processor 28 to provide functions for the modules. The plurality of modules includes a sensing module 101, a recognizing module 102, an analyzing module 103, an executing module 104, and a setting module 105.

The sensing module 101 obtains the audio information from the audio capturing device 23 and the image information from the image capturing device 22.

The recognizing module 102 recognizes a target according to the audio information and the image information. In at least one embodiment, the recognizing module 102 pre-processes the audio information, such as reducing background noise, to make the audio information clearer. In at least one embodiment, the recognizing module 102 recognizes a voiceprint from the audio information and recognizes a faceprint from the image information, and recognizes the target according to the voiceprint and the faceprint. The target can be a user or an animal. For example, the storage 29 stores a first relationship table (not shown in figures) which defines a relationship of the voiceprints and the faceprints to the targets. The recognizing module 102 recognizes the target according to the voiceprint and the faceprint as defined in the first relationship table. In another embodiment, the recognizing module 102 recognizes the target from the audio information. For example, the storage 29 stores a second relationship table (not shown in figures) which defines a relationship of the voiceprints to the targets. The recognizing module 102 recognizes the target according to the voiceprint as defined in the second relationship table. In another embodiment, the recognizing module 102 recognizes the target from the image information. For example, the storage 29 stores a third relationship table (not shown in figures) which defines a relationship of the faceprints to the targets. The recognizing module 102 recognizes the target according to the faceprint as defined in the third relationship table. In at least one embodiment, the recognizing module 102 compares the faceprint of the image information to the images stored in the storage 29 and determines the target when the faceprint of the image information matches the faceprint in the third relationship table.

In at least one embodiment, the target can be an object, such as a table, a chair, an apartment, or the like. The recognizing module 102 compares images captured by the image capturing device 22 to a series of images stored in the storage 29 and recognizes the target based on a result of comparison. Each image in the series of images includes a corresponding target. For example, when the recognizing module 102 determines that the object in a captured image is the same as an apartment shown in an image stored in the storage 29, the recognizing module 102 recognizes that the object in the captured image is an apartment.

The recognizing module 102 further determines information related to the target, such as the basic information and the event information, and links the basic information with the event information. In at least one embodiment, the related information includes, but is not limited to, basic information of the target and event information of the target. In at least one embodiment, when the target is a user, the basic information of the target includes, but is not limited to, a name, age, height, weight, and body type of the user. When the target is an object, the basic information of the target includes, but is not limited to, a name, location, and function of the object. For example, the storage 29 stores a basic information table T1 (shown in FIG. 4). The basic information table T1 defines a relationship between the target and the basic information. The recognizing module 102 determines the basic information of the target according to the basic information table T1.

In at least one embodiment, the event information of the target refers to an event occurring at any time or at any place. In at least one embodiment, when the target is recognized, the recognizing module 102 controls the audio capturing device 23 to capture audio as the event information of the target. In another embodiment, when the target is recognized, the recognizing module 102 controls the image capturing device 22 to capture images of the target as the event information of the target. In another embodiment, when the target is recognized, the recognizing module 102 controls the audio capturing device 23 to capture audio and controls the image capturing device 22 to capture images as the event information of the target.

The analyzing module 103 obtains the key information from the event information. For example, when the event information is audio information, the analyzing module 103 recognizes audio information and converts the audio information into text data, obtains the key information from the text data, and then sets the key information of the text data as the key information. In at least one embodiment, the key information of the text data includes key phrases, key words, or key sentences. When the event information of the target is image information, the analyzing module 103 obtains facial expression information and limb movement information from the image information, obtains facial image parameters from the image expression information, obtains limb movement parameters from the limb movement information, and sets the facial expression parameters and the limb movement parameters as the key information of the event information.

The analyzing module 103 implements a neural network analysis algorithm on the key information to confirm an emotion type of the target, searches a preset public knowledge database according to the key information to obtain a relevant result, and applies a deep learning algorithm on the relevant result and the emotion type of the target to determine a response. In at least one embodiment, the response refers to a series of commands for controlling the interactive robot 2 to interact with the target.

In at least one embodiment, the public knowledge database can include information related to, but not limited to, human ethics, laws and regulations, moral sentiment, religion, astronomy, and geography. In at least one embodiment, the public knowledge base is stored in the storage 29 of the interactive robot 2, such that the interactive robot 2 can directly search the storage 29 for the public knowledge database. In another embodiment, the public knowledge database is stored in the server 3, such that the interactive robot 2 communicates with the server 3 through the communication device 27 to search the public knowledge database.

In at least one embodiment, the deep learning algorithm can include, but is not limited to, a neuro-bag model, a recurrent neural network, and a convolutional neural network. In at least one embodiment, the emotion type of the target includes happy, sad, angry, calm, irritable, or the like. For example, when a user smiles at the interactive robot 2 and says, "these flowers are really pretty!", the sensing module 101 obtains the audio information from the audio capturing device 23 and obtains the image information from the image capturing device 22. The recognizing module 102 recognizes the voiceprint from the audio information and recognizes the faceprint from the image information. The recognizing module 102 recognizes the target from the voiceprint and the faceprint. The recognizing module 102 determines the basic information of the user and sets the audio information "these flowers are beautiful!" and the smiling expression of the user as the event information, and then links the event information with the basic information of the user. The analyzing module 103 obtains the key words "flowers" and "beautiful" to be the key information of the audio information, and obtains "smiling expression" as the key information of the image information, and implements the neural network analysis algorithm to determine that the emotion type of the target is happy. The analysis module 103 searches the public knowledge database according to the key information, and implements the deep learning algorithm according to the search result and the happy emotion type to determine the response.

In at least one embodiment, the setting module 105 sets emotions of the interactive robot 2. The emotions of the interactive robot 2 include encouraging, soothing, sarcastic, humorous, or the like. The analyzing module 103 obtains the key information from the event information, implements the neural network analysis algorithm to determine the emotion type of the target, searches the public knowledge database according to the key information, and implements the deep learning algorithm according to the search result, the emotion type of the target, and the emotions of the interactive robot 2 to determine the response. In at least one embodiment, the emotion type includes, but is not limited to, happy, angry, sad, happy, or the like.

In at least one embodiment, the sensing module 101 senses a pressure through the pressure sensing device 24 senses an odor of a surrounding environment through the odor sensing device 26. The analyzing module 103 searches the public knowledge database according to the key information to obtain the search result, and implements the deep learning algorithm according to the search result, the emotion type of the target, the sensed pressure, and the sensed odor to determine the response.

The executing module 104 executes the response through the output device 25. In at least one embodiment, the executing module 104 outputs audio information and an expression to execute the response to realize human-robot interaction between the target and the interactive robot 2. In detail, the executing module 104 outputs audio information through the audio output device 251 and outputs the expression through the expression output device 252. For example, when a user smiles at the interactive robot 2 and says, "these flowers are really pretty!", the recognizing module 102 recognizes that the target is a user. The analyzing module 103 obtains the key information from the audio information to be "flowers" and "pretty" and obtains the key information from the image information to be "smiling expression". The analyzing module 103 implements the neural network analysis algorithm according to the key information "flowers", "beautiful", and "smiling expression" to determine that the emotion type of the target is happy. The analysis module 103 searches the public knowledge database according to the key information "flowers", "beautiful", and "smiling expression" to obtain a search result, and implements the deep learning algorithm according to the search result and the happy emotion type to determine the response. The response refers to a command to control the interactive robot 2 to output the audio information "these flowers are really pretty, I also like them!" and output a smiling expression. The executing module 104 outputs the audio information "these flowers are really pretty, I also like them!" through the audio output device 251 and outputs the smiling expression through the expression output device 252 to control the eyelids and the mouth on the head of the interactive robot 2 to open and close and to control the eyeballs to rotate to output a smiling expression, thereby realizing human-robot interaction.

In other embodiments, the executing module 104 uses the movement output device 253 to control the interactive robot 2 according to a preset movement and controls the display output device 254 to display a preset facial expression to execute the response to realize human-robot interaction between the interactive robot 2 and the target.

Figure 5:
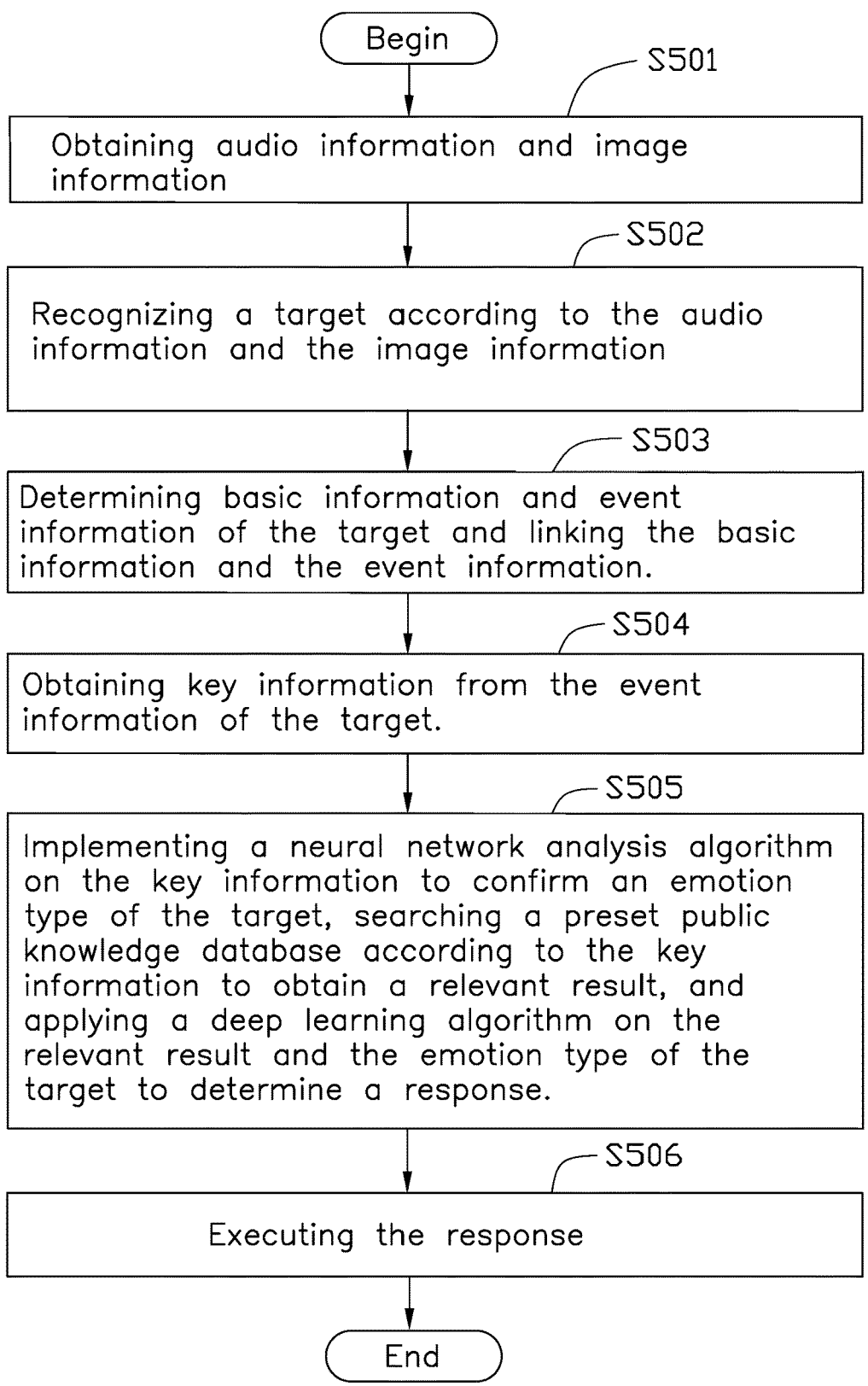
FIG. 5 is a flowchart diagram of an embodiment of a human-robot interaction method.

FIG. 5 illustrates a flowchart of an exemplary method for implementing human-robot interaction. The example method is provided by way of example, as there are a variety of ways to carry out the method. The method described below can be carried out using the configurations illustrated in FIGS. 1-4, for example, and various elements of these figures are referenced in explaining the example method. Each block shown in FIG. 5 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S501.

At block S501, audio information and image information are obtained.

At block S502, a target is recognized according to the audio information and the image information. In at least one embodiment, the audio information is preprocessed, such as by reducing background noise, to make the audio information clearer. In at least one embodiment, a voiceprint is recognized from the audio information, and a faceprint is recognized from the image information, and the targarget is recognized according to the voiceprint and the faceprint. The target can be a user or an animal. In at least one embodiment, the target is an object, such as a desk, a chair, an apartment, or the like. The images obtained are compared to a series of images stored in the interactive robot, and the target is recognized based on a result of comparison.

At block S503, basic information of the target and event information of the target are determined, and the basic information and the event information are linked.

It at least one embodiment, when the target is a user, the basic information of the target includes, but is not limited to, a name, age, height, weight, and body type of the user. When the target is an object, the basic information of the target includes, but is not limited to, a name, location, and function of the object. For example, the interactive robot stores a basic information table T1. The basic information table T1 defines a relationship between the target and the basic information. The basic information of the target is determined according to the basic information table T1.

In at least one embodiment, the event information of the target refers to an event occurring at any time or at any place. In at least one embodiment, when the target is recognized, audio is captured as the event information of the target. In another embodiment, when the target is recognized, images of the target are captured as the event information of the target. In another embodiment, when the target is recognized, audio and images are captured as the event information of the target.

At block S504, key information is obtained from the event information of the target. For example, when the event information is audio information, the audio information is converted into text data, key information is obtained from the text data, and then the key information of the text data is set as the key information. In at least one embodiment, the key information of the text data includes key phrases, key words, or key sentences. When the event information of the target is image information, facial expression information and limb movement information are obtained from the image information, facial image parameters are obtained from the image expression information, limb movement parameters are obtained from the limb movement information, and the facial expression parameters and the limb movement parameters are set as the key information of the event information.

At block S505, a neural network analysis algorithm is implemented on the key information to confirm an emotion type of the target, a preset public knowledge database is searched according to the key information to obtain a relevant result, and a deep learning algorithm is applied on the relevant result and the emotion type of the target to determine a response.

In at least one embodiment, the response refers to a series of commands for controlling the interactive robot to interact with the target. In at least one embodiment, the public knowledge database can include information related to, but not limited to, human ethics, laws and regulations, moral sentiment, religion, astronomy, and geography. In at least one embodiment, the public knowledge database is stored in the interactive robot, such that the interactive robot can directly search the public knowledge database. In another embodiment, the public knowledge database is stored in a server, such that the interactive robot communicates with the server through a communication device to search the public knowledge database.

In at least one embodiment, the deep learning algorithm can include, but is not limited to, a neuro-bag model, a recurrent neural network, and a convolutional neural network. In at least one embodiment, the emotion type of the target includes happy, sad, angry, calm, irritable, or the like. For example, when a user smiles at the interactive robot and says, "these flowers are really pretty!", the audio information and the image information are obtained. The voiceprint is recognized from the audio information, and the faceprint is recognized from the image information. The target is recognized from the voiceprint and the faceprint. The basic information of the user is determined, and the audio information "these flowers are beautiful!" and the smiling expression of the user are set as the event information, and then the event information is linked with the basic information of the user. The key words "flowers" and "beautiful" are obtained to be the key information of the audio information, and "smiling expression" is obtained as the key information of the image information, and the neural network analysis algorithm is implemented to determine that the emotion type of the target is happy. The public knowledge database is searched according to the key information, and the deep learning algorithm is implemented according to the search result and the happy emotion type to determine the response.

At block S506, the response is executed. In detail, audio information and an expression are output. For example, when a user smiles at the interactive robot 2 and says, "these flowers are really pretty!", the target is recognized as a user. The key information from the audio information is obtained as "flowers" and "pretty" and the key information from the image information is obtained as "smiling expression". The neural network analysis algorithm is implemented according to the key information "flowers", "beautiful", and "smiling expression" to determine that the emotion type of the target is happy. The public knowledge database is searched according to the key information "flowers", "beautiful", and "smiling expression" to obtain a search result, and the deep learning algorithm is implemented according to the search result and the happy emotion type to determine the response. The response refers to a command to control the interactive robot to output the audio information "these flowers are really pretty, I also like them!" and output a smiling expression. The audio information "these flowers are really pretty, I also like them!" and the smiling expression to control eyelids and a mouth on a head of the interactive robot to open and close and to control the eyeballs to rotate to output a smiling expression are output, thereby realizing human-robot interaction.

In other embodiments, the interactive robot is controlled according to a preset movement and is controlled to display a preset facial expression to execute the response to realize human-robot interaction between the interactive robot and the target.

In at least one embodiment, emotions of the interactive robot are set. The emotions of the interactive robot include encouraging, soothing, sarcastic, humorous, or the like. The key information is obtained from the event information, the neural network analysis algorithm is implemented to determine the emotion type of the target, the public knowledge database is searched according to the key information, and the deep learning algorithm is implemented according to the search result, the emotion type of the target, and the emotions of the interactive robot to determine the response. In at least one embodiment, the emotion type includes, but is not limited to, happy, angry, sad, happy, or the like.

In at least one embodiment, a pressure applied on the interactive robot is sensed and an odor of a surrounding environment is sensed. The public knowledge database is searched according to the key information to obtain the search result, and the deep learning algorithm is implemented according to the search result, the emotion type of the target, the sensed pressure, and the sensed odor to determine the response.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:
1. An interactive robot comprising:
an image capturing device;
an audio capturing device;
at least one output device; and
at least one processor configured to:
obtain audio information captured by the audio capturing device and image information captured by the image capturing device;
recognize a target from the audio information and the image information;
confirm basic information and event information of the target and link the basic information with the event information;
obtain key information from the event information of the target;
implement a neural network analysis algorithm on the key information to confirm an emotion type of the target, search a preset public knowledge database according to the key information to obtain a relevant result, apply a deep learning algorithm on the relevant result and the emotion type of the target to determine a response; and execute the response through the output device;

wherein the response is a series of instructions for controlling the interactive robot to interact with the target.

2. The interactive robot of claim 1, wherein the processor recognizes a voiceprint from the audio information and recognizes a faceprint from the image information, and recognizes the target from the voiceprint and the faceprint.

3. The interactive robot of claim 1, wherein the processor controls the audio capturing device to set the audio information of the target as the event information of the target.

4. The interactive robot of claim 3, wherein the processor recognizes the audio information, converts the audio information into text data, and obtains key information from the text data; the key information from the text data is the key information of the event information.

5. The interactive robot of claim 1, wherein the processor controls the image capturing device to set the image information of the target as the event information of the target.

6. The interactive robot of claim 5, wherein the processor obtains facial expression information and limb movement information from the image information, obtains facial expression parameters from the facial expression information, obtains limb movement parameters from the limb movement information, and sets the facial expression parameters and the limb movement parameters as the key information of the event information.

7. The interactive robot of claim 1, wherein the processor is further configured to set emotions of the interactive robot; the processor implements a neural network analysis algorithm on the key information to confirm an emotion type of the target, searches a preset public knowledge database according to the key information to obtain a relevant result, applies a deep learning algorithm on the relevant result, the emotion type of the target, and the set emotions of the interactive robot to determine the response.

8. The interactive robot of claim 1, wherein the output device includes an audio output device and an expression output device; the processor controls the audio output device to output audio information as the response and controls the expression output device to output an expression to execute the response.

9. A human-robot interacting method implemented in an interactive robot, the method comprising:
obtaining audio information captured by an audio capturing device and image information captured by an image capturing device;
recognizing a target from the audio information and the image information;
confirming basic information and event information of the target and linking the basic information with the event information;
obtaining key information from the event information of the target;
implementing a neural network analysis algorithm on the key information to confirm an emotion type of the target, searching a preset public knowledge database according to the key information to obtain a relevant result, applying a deep learning algorithm on the relevant result and the emotion type of the target to determine a response; and
executing the response through the output device;
wherein the response is a series of instructions for controlling the interactive robot to interact with the target.

10. The method of claim 9, wherein the target is recognized from the audio information and the image information by recognizing a voiceprint from the audio information and recognizing a faceprint from the image information.

11. The method of claim 9, wherein the basic information and the event information are confirmed and linked together by setting the audio information captured by the audio capturing device as the event information.

12. The method of claim 11, wherein the audio information is recognized and converted into text data, key information is obtained from the text data, and the key information from the text data is set as the key information of the event information.

13. The method of claim 9, wherein the basic information and the event information are confirmed and linked together by setting the image information captured by the image capturing device as the event information.

14. The method of claim 13, wherein facial expression information and limb movement information are obtained from the image information, facial expression parameters are obtained from the facial expression information, limb movement parameters are obtained from the limb movement information, and the facial expression parameters and the limb movement parameters are set as the key information of the event information.

15. The method of claim 9, wherein an audio output device is controlled to output audio information as the response, and an expression output device is controlled to output an expression to execute the response.

16. A non-transitory storage medium having stored thereon instructions that, when executed by at least one processor of an interactive robot, causes the least one processor to execute instructions of a method for human-robot interaction, the method comprising:
obtaining audio information captured by an audio capturing device and image information captured by an image capturing device;
recognizing a target from the audio information and the image information;
confirming basic information and event information of the target and linking the basic information with the event information;
obtaining key information from the event information of the target;
implementing a neural network analysis algorithm on the key information to confirm an emotion type of the target, searching a preset public knowledge database according to the key information to obtain a relevant result, applying a deep learning algorithm on the relevant result and the emotion type of the target to determine a response; and
executing the response through the output device;
wherein the response is a series of instructions for controlling the interactive robot to interact with the target.

* * * * *